(12) United States Patent
Slusarek et al.

(10) Patent No.: US 10,298,886 B2
(45) Date of Patent: May 21, 2019

(54) METHOD OF REPRESENTING POSSIBLE MOVEMENTS OF A STRUCTURE FOR AN APPARATUS OF SMARTPHONE TYPE

(75) Inventors: Stephane Slusarek, Rueil-Malmaison (FR); Fabien Ranvier, Rueil-Malmaison (FR); Paul Da Fonseca, Rueil-Malmaison (FR)

(73) Assignee: SOLETANCHE FREYSSINET, Ruell-Malmaison (FR)

( * ) Notice: Subject to any disclaimer, the term of this patent is extended or adjusted under 35 U.S.C. 154(b) by 1113 days.

(21) Appl. No.: 14/131,226

(22) PCT Filed: Jul. 3, 2012

(86) PCT No.: PCT/FR2012/051543
§ 371 (c)(1),
(2), (4) Date: Apr. 21, 2014

(87) PCT Pub. No.: WO2013/007917
PCT Pub. Date: Jan. 17, 2013

(65) Prior Publication Data
US 2014/0232864 A1    Aug. 21, 2014

(30) Foreign Application Priority Data
Jul. 12, 2011 (FR) ...................... 11 56359

(51) Int. Cl.
| | | |
|---|---|---|
| H04N 7/18 | (2006.01) | |
| G01C 15/00 | (2006.01) | |
| G01C 21/20 | (2006.01) | |
| G01M 5/00 | (2006.01) | |
| G01M 11/08 | (2006.01) | |

(52) U.S. Cl.
CPC ............. *H04N 7/183* (2013.01); *G01C 15/00* (2013.01); *G01C 21/20* (2013.01); *G01M 5/005* (2013.01);
(Continued)

(58) Field of Classification Search
CPC ......... H04L 67/10; H04L 67/12; H04L 63/08; H04L 12/2803; H04W 12/06; H04W 4/12;
(Continued)

(56) References Cited

U.S. PATENT DOCUMENTS 6,473,166 B1   10/2002  Ohishi et al.
6,734,952 B2 *  5/2004  Benz ................... G01C 15/002
                                                       356/141.1
(Continued)

*Primary Examiner* — Dave Czekaj
*Assistant Examiner* — Kehinde O Abimbola
(74) *Attorney, Agent, or Firm* — MH2 Technology Law Group, LLP

(57) ABSTRACT

The invention relates to a method of representing the movements, if any, of a structure (10), the method being performed in an appliance (50) including a camera (52), said structure being provided with at least one movement measurement device (20, 22, 24). The invention comprises:
a step of acquiring an image of the structure with the help of the camera;
a step of sending a query to a remote server (30);
a step of receiving at least some information about the movement measurement device in response to said query, said information including data about at least one measurement obtained with the help of the movement measurement device; and
a step of inserting said measurement data in said image.

11 Claims, 5 Drawing Sheets

(52) U.S. Cl.
CPC ........ *G01M 5/0091* (2013.01); *G01M 11/081* (2013.01); *H04M 2250/52* (2013.01)

(58) Field of Classification Search
CPC ... H04W 4/206; H04W 84/005; H04W 12/08; H04W 36/0005; H04W 36/32; H04N 21/214; H04N 21/2181; H04N 21/25841; H04N 21/04; G06T 19/006; G06T 2207/30221; G06T 7/20; G06T 1/20; G06T 2207/30004; G06T 2207/30168; G06T 2207/30241; G06T 3/4084; G06T 7/0002; G01S 13/74; G01S 13/84; G01S 13/87; G01S 17/32; G01S 1/02; G01S 3/42; G01S 3/782; G01S 5/0294; G06F 17/50; G06F 19/70; G06F 2217/04; G06F 3/04812; G06F 3/04842; G06F 3/167
See application file for complete search history.

(56) References Cited

U.S. PATENT DOCUMENTS

| | | | | |
|---|---|---|---|---|
| 7,079,234 B2 * | 7/2006 | Vogel | ................. | G01S 5/163 356/141.1 |
| 7,342,650 B2 * | 3/2008 | Kern | ................. | G01C 1/04 356/5.02 |
| 7,679,727 B2 * | 3/2010 | Benz | ................. | G01C 15/002 356/4.01 |
| 8,289,528 B2 * | 10/2012 | Westermark | ................. | G01C 9/20 356/614 |
| 9,046,362 B2 * | 6/2015 | Westermark | ................. | G01C 15/002 |
| 2003/0169414 A1 * | 9/2003 | Benz | ................. | G01C 15/002 356/5.1 |
| 2004/0174542 A1 | 9/2004 | Handman | | |
| 2004/0223139 A1 * | 11/2004 | Vogel | ................. | G01S 5/163 356/141.1 |
| 2006/0158423 A1 * | 7/2006 | Kern | ................. | G01C 1/04 345/156 |
| 2008/0204699 A1 * | 8/2008 | Benz | ................. | G01C 15/002 356/4.01 |
| 2010/0141261 A1 * | 6/2010 | Overby | ................. | G01V 3/12 324/329 |
| 2011/0001986 A1 * | 1/2011 | Westermark | ................. | G01C 9/20 356/615 |
| 2011/0066375 A1 * | 3/2011 | France | ................. | G01C 15/00 701/469 |
| 2012/0326709 A1 * | 12/2012 | Westermark | ................. | G01C 25/00 324/207.25 |

* cited by examiner

METHOD OF REPRESENTING POSSIBLE MOVEMENTS OF A STRUCTURE FOR AN APPARATUS OF SMARTPHONE TYPE

TECHNICAL FIELD OF THE DISCLOSURE

The present invention relates to the technical field of monitoring movements of a structure, e.g. a building, a bridge, foundations, a soil, a road, a dam, a tunnel, or any other structure of the engineering work type that might deform or be physically damaged in static or dynamic manner.

Throughout the specification, the term "movement" is used to cover both local deformations and more generally any local or global displacement of the structure.

BACKGROUND OF THE DISCLOSURE

By way of example, the deformation of such a structure may be caused by a natural phenomenon or may be the result of work being carried out close to the structure. For example, when building a tunnel under a city, it is important to monitor the state and the deformation of buildings situated on the surface all along the route.

Likewise, it is necessary to check a dam regularly for any deformation in order to be sure that it is not about to give way.

At present, in order to monitor the deformation of a structure, it is known to place one or more measurement devices on the structure, to acquire measurement data supplied by each of the measurement devices, and to process the data in order to generate an alarm if it is found that the measured deformation exceeds a predetermined threshold.

In general, the processed data, and more generally the monitoring operations, are viewed in a control center that is not necessarily situated on site or in the proximity of the monitored structure.

Consequently, teams working on site or in the proximity of the monitored structure find it difficult to access the data directly. In addition, operators do not necessarily know where the measurement devices have been placed and which measurement devices have detected deformation that has given rise to an alarm.

SUMMARY OF THE DISCLOSURE

An object of the invention is to improve the information available to people situated in the proximity of the structure to be monitored, by enabling them to have fast and easy access to information about the movement measurement devices.

To this end, the invention relates to a method of representing the movements, if any, of a structure to be monitored, which method is performed in an appliance including a camera, said structure being provided with at least one movement measurement device that is secured to said structure in order to enable any deformations of the structure to be measured, said method comprising:
- an acquisition step of acquiring an image of the structure with the help of the camera;
- a sending step of sending a query from the appliance to a remote server;
- a reception step of the appliance receiving at least some information in response to said query about the movement measurement device, said information including data about at least one measurement obtained with the help of the movement measurement device; and
- an insertion step of inserting data about said at least one movement measurement in said image.

This method is performed in an appliance that is preferably, but not necessarily, a mobile system. For example, it may be a smartphone, a cell phone, a tablet, a laptop computer, or any other mobile system. It could equally well be a desktop system. The appliance is also provided with a display device, e.g. a screen, for displaying the image in which the information about the movement measurement device is inserted. In other words, the display device of the appliance displays the image of the structure together with information about the movement measurement device, this information being superposed on the image of the structure, for example. Thus, the user of the appliance can quickly and easily access information about the movement measurement device situated on the structure to be monitored. The user thus has an augmented reality or virtuality environment.

In the meaning of the invention, the structure to be monitored is of the engineering work type, such as a building, a bridge, foundations, a road, a tunnel, a dam, or any other engineering work that might become deformed or physically damaged in static or dynamic manner. The structure may also be a soil, e.g. an embankment.

The method of the invention is preferably performed periodically or in real time. Consequently, the user can obtain information continuously, thus enabling the user to be informed very quickly if a new event occurs. Alternatively, the user may recover the information periodically, e.g. once or twice a day and then use the appliance with the stored information without needing to connect with the server.

In the meaning of the invention, the term "camera" is used to mean a device for taking still pictures or motion pictures. As a general rule, there will be a motion picture camera in the appliance, of the kind to be found nowadays in cell phones and tablets.

By way of example, the movement measurement device (s) arranged on the structure to be monitored may be: vibration sensors; measurement targets for sighting by one or more theodolites; or any other device for measuring movement or deformation.

The query is sent over a network which may be of the internet, intranet, extranet, cellular, wired, or wireless type. For this purpose, conventional communications protocols are used, which may optionally be encrypted, e.g. but not exclusively protocols of the TCP/IP (transmission control protocol/internet protocol) type. It can thus be understood that the appliance and the server communicate with each other via the computer network.

Said information about the movement measurement device is preferably stored in a database situated in the remote server. Also preferably, the remote server is connected to the movement measurement device directly, or via a network, in order to receive information about said movement measurement device, either periodically or in real time.

The method of the invention is preferably performed in real time. Consequently, the information about the movement measurement device as displayed on the screen of the appliance is updated in real time.

Advantageously, the movement measurement device is a measurement target that is sighted by a theodolite connected to the remote server. Under such circumstances, the measurement data is supplied by the theodolite.

Advantageously, the movement measurement device is a sensor connected to the remote server.

Naturally, the signal may be provided with measurement targets and/or sensors.

By way of example, the sensor may be an extensometer or indeed a vibration sensor.

The measurement data is thus inserted in the image, e.g. in alphanumerical form, or else in the form of a color code or using any other graphics or audible type of representation.

For example, but in non-exclusive manner, the measurement data corresponds to the most recent measurement taken by the movement measurement device. The received measurement data may also be a history of measurements taken by the measurement device, or may be the result of preprocessing in order to present the information in more pertinent manner.

The operator can thus easily and quickly be informed about a problem associated with the structure, as identified with the help of the movement measurement device. For example, the movement measurement device may detect a movement or a deformation exceeding a determined threshold, and consequently an alarm is triggered and displayed on the screen of the appliance.

Advantageously, the information about the movement measurement device also includes the operating state of the movement measurement device or of the theodolite sighting the movement measurement device. It may thus be the operating state of the sensor or of the theodolite. It may also be the operating state of a measurement target sighted by the theodolite, with a measurement target that the theodolite cannot see being considered as presenting a malfunction.

This information is inserted in the image in the form of a word, an alphanumerical code, or a graphics or audible representation. In particular, the invention makes it easy for the operator to monitor the movement measurement device while on the site where the monitored structure is located. In particular, the operator can thus easily visualize the failed measurement device(s) on the display device of the appliance.

Advantageously, the information about the measurement device further comprises the coordinates of the movement measurement device.

The coordinates may be inserted raw in the image. However, said coordinates are preferably used for positioning the movement measurement device in the image.

To this end, during the step of inserting information about the movement measurement device in said image, a positioning step is advantageously performed for positioning a graphics representation of the movement measurement device in the image.

This positioning preferably consists in inserting a design in the image or in superposing it on the image, which design may for example be a dot, an arrow, a label, or any other visual representation or symbol, serving in particular to inform the user where the movement measurement device is situated on the structure.

This information is also preferably updated in real time. Consequently, when the user moves the camera, the position of the measurement device in the image is updated in real time.

As mentioned above, the positioning step is performed with the help of the coordinates of the movement measurement device.

In a first variant, the coordinates of the movement measurement device are downloaded from the server, periodically or in real time. For this purpose, the method of the invention includes a downloading step of downloading the coordinates of the movement measurement device from the remote server.

In another variant, the coordinates of the movement measurement device are preloaded in a memory of the appliance, which memory may be removable or non-removable. To do this, the method of the invention also includes a storage step of storing said coordinates in a memory of the appliance.

In another variant, the storage step may also be performed during or after the downloading step.

When the structure to be monitored has a plurality of movement measurement devices, the positioning step advantageously includes a filtering step in which those movement measurement devices that are situated in the field of view of the camera are selected. Preferably, only the selected movement measurement devices are inserted in the image of the structure.

In a preferred implementation, the filtering step uses the geographical position of the appliance, the orientation of the appliance, and/or the inclination of the appliance.

The geographical position of the appliance is preferably obtained using a positioning device, e.g. a satellite positioning device of the GPS (global positioning system) type, or any other geolocation system, preferably included in the appliance. If the appliance is also connected to a cell phone network, the position of the appliance may also be determined by using a triangulation method, in known manner.

When the structure is a tunnel, the appliance is advantageously located by a shape recognition method. For this purpose, positioning marks may be placed in the tunnel in order to assist recognition. Alternatively, the appliance may be positioned by triangulation using network terminals, e.g. WiFi terminals, arranged in the tunnel, or by using any other positioning device.

The orientation of the appliance and the inclination of the appliance are obtained using an electronic compass included in the appliance. It is also possible to use one or more electronic gyros in the appliance in order to obtain fine control in the management of the movements of the appliance. In addition, the inclination of the appliance may be obtained with the help of an inclinometer in the appliance, which inclinometer may be constituted by one or more accelerometers.

The filtering step preferably also uses the characteristics of the camera, in particular the focal length and the aperture angle of its objective lens.

Advantageously, the positioning step includes a recognition step of recognizing the structure situated in said image. This recognition step is preferably, but not necessarily, combined with the above-described filtering step.

The recognition step makes it possible to identify the monitored structure and consequently to know accurately the position(s) of the measurement device(s).

To do this, the recognition step advantageously includes an analysis step of analyzing the characteristic shape of the structure situated in the image, and a comparison step of comparing the characteristic shape with characteristic shapes stored in a database. The analysis and comparison steps are performed by a shape recognition algorithm that is itself known. Since the positions of the movement measurement devices are associated with the characteristic shape, it is then possible to recalibrate the positions of the movement measurement devices in the image.

Thus, the operator can view the exact position(s) of the movement measurement device(s) on the display device of the appliance together with data about one or more measurements taken by said measurement device(s).

Advantageously, the method of the invention further includes a sending step of sending a query from the appliance to the remote server and a reception step of the appliance receiving information about the deformation of the structure in response to said query.

This information about the deformation of the structure may for example be constituted by one or more geometrical curves or surfaces representing the deformation of the monitored structure. By way of example it may be a simulation of the deformation of the monitored structure that takes account of the recorded measurement data. It may also be a settling curve of the structure.

This information about the deformation of the structure is advantageously inserted in the image.

Thus, by means of the invention, the appliance becomes a tool for assisting decision making.

The invention also provides a computer program including instructions for executing the steps of the method of the invention, when said program is executed by a computer. Specifically, the computer is preferably included in the appliance.

The instructions are in the form of executable code that is preferably stored in a memory housed within the appliance, e.g. a storage unit or a hard disk.

The invention also provides a method of representing the movements, if any, of a structure, said structure being provided with at least one movement measurement device secured to the structure in order to enable any movement of the structure to be measured, said method comprising:

an acquisition step of acquiring an image of the structure with the help of a camera arranged in an appliance;
an acquisition step of acquiring data about at least one movement measurement obtained with the help of the measurement device;
a transmission step of transmitting said movement measurement data to a remote server that is distinct from the appliance;
a sending step of sending a query from the appliance to the remote server;
a reception step of the appliance receiving said movement measurement data in response to the query;
an insertion step of inserting said movement measurement data into said image; and
a display step of displaying, on the appliance, an image having the movement measurement data inserted therein.

The installation also provides an appliance, preferably but not necessarily a mobile appliance, that includes a camera, a display device, and software means adapted to perform the method of the invention.

The appliance is preferably mobile. Also preferably, it is provided with one or more elements selected from a GPS type satellite positioning device, an electronic compass, an inclinometer, an electronic gyro, and an accelerometer. It also includes at least one memory for storing the software means together with the information about the above-described movement measurement device(s). It also includes means for transmitting and receiving data via the computer network, and at least one microprocessor.

By way of example, the display device is an LCD (liquid crystal display) screen incorporated in the appliance.

Finally, the invention provides an installation comprising a plurality of movement measurement devices secured to a structure to be monitored, a remote server receiving measurement data obtained with the help of the movement measurement devices, and at least one appliance of the invention in communication with the remote server.

Advantageously, the server of the installation includes recovery means and storage means for recovering and storing measurement data obtained with the help of the measurement devices.

As mentioned above, the measurement data is delivered by the movement measurement devices when they are sensors, e.g. an extensometer or a vibration sensor, whereas when the movement measurement devices are measurement targets, e.g. prisms, the measurement data is delivered to the server by the theodolite(s) sighting said target.

By way of example, the recovery means comprise at least one wired or wireless network communications link.

Advantageously, the remote server further includes transmission means for transmitting said measurement data to the appliance.

Preferably, the movement measurement devices comprise at least one measurement target sighted by a theodolite that is connected to the remote server, or at least one sensor that is connected to the remote server.

BRIEF DESCRIPTION OF THE DRAWINGS

The invention can be better understood on reading the following description of implementations of the invention given as non-limiting examples and with reference to the accompanying drawings, in which.

DETAILED DESCRIPTION OF THE DISCLOSURE

The present invention is an augmented reliability application for monitoring potential movements of structures, such as buildings, bridges, foundations, roads, tunnels, dams, soils, or any other structure that might deform. The present invention is thus particularly applicable to monitoring soils or engineering works that might move or deform.

The movements may be due to work being performed nearby or under the structure or it may be the consequence of ground movements. The term "movements" is used to cover both displacements and local deformations of the monitored structure. In particular, "movement" may comprise vibration to which the structure is subjected locally.

Figure 1:
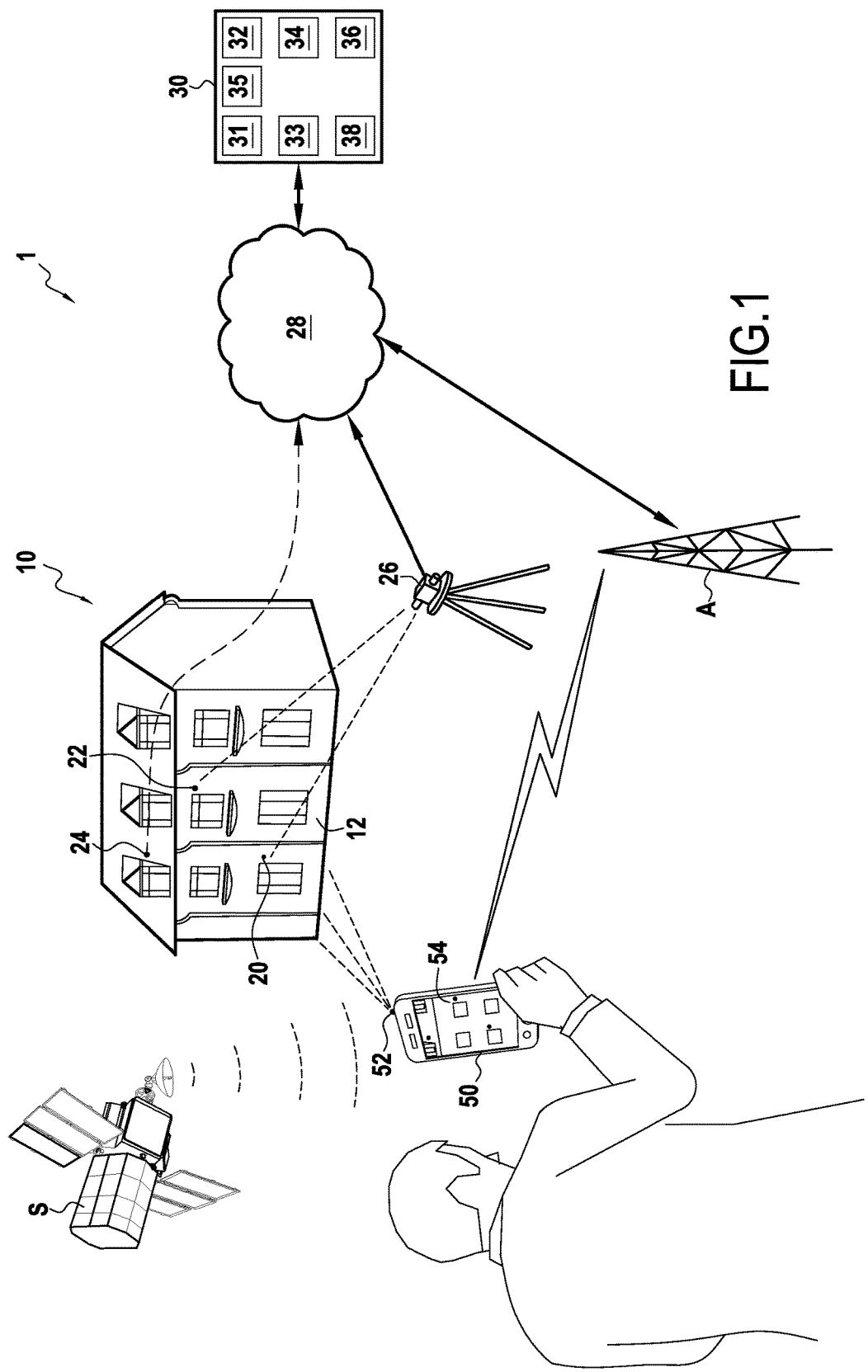
FIG. 1 is a diagram of an installation of the invention comprising an appliance of the invention providing a user with information about movement measurement devices placed on a structure to be monitored.

In the example installation 1 shown in FIG. 1 and given by way of non-limiting example, the idea is to monitor a work that is constituted in this non-limiting example by a building 10 because a tunnel (not shown here) is being built under the building. It is therefore desired to be able to monitor in real time any movements or deformation of the building 10. In this respect, the building 10 has a plurality of movement measurement devices 20, 22, and 24, specifically two measurement targets 20 and 22 secured to its front elevation while being sighted by a theodolite 26, and also an extensometer 24. Naturally, this is a non-limiting example. Without going beyond the ambit of the invention, it may be envisaged to make use of one measurement target or a greater number of them. Other measurement devices such as vibration sensors or other detectors may also be provided.

In known manner, the theodolite 26 serves to measure the movements of the measurement targets 20, 22 relative to their initial positions of known coordinates.

The theodolite takes measurements periodically, e.g. one measurement every two hours, and generates measurement data which is preferably transmitted via a communications network 28, e.g. the internet, to a server 30.

The server 30 has storage means 32 for storing the measurement data supplied by the movement measurement devices 20, 22, and 24. In this example, the storage means are constituted, for example, by one or more hard disks 32 situated in the server or in a remote computer.

The server 30 also has two data recovery means 34 for recovering the data supplied by the measurement devices 20, 22, and 24.

The extensometer 24 serves to measure local deformations of the front elevation of the building 10. It thus periodically supplies measurement data that is likewise transmitted to the server 30 via the network 28 and stored in the storage means 32.

The server 30 also has transmission means 36 for transmitting data about at least one measurement to one or more appliances, and it also has one or more microprocessors 38.

It can thus be understood that the server 30 includes or is connected to a database 31 that stores the various measurements taken by each of the measurement devices 20, 22, and 24. The database also has the geographical coordinates of each of the measurement devices 20, 22, and 24.

In accordance with the invention, the method of monitoring the deformation of the building 10 is performed in particular by means of an appliance 50. In this example, it is a mobile system, specifically a cell phone of the smartphone type, that has a camera 52, preferably capable of taking motion pictures. The appliance 50 also has a display device 54, preferably a display screen, that makes it possible to display the images taken by the camera 52.

In conventional manner, the appliance also has a positioning device, e.g. a GPS communicating with one or more satellites S, enabling the geographical position of the appliance to be determined and providing the geographical coordinates of the appliance.

In application, the appliance 50 has means for determining the orientation of the appliance in a horizontal plane. Specifically, it is a compass suitable for providing the orientation of the appliance in a horizontal plane in the form of an angle value. It is also possible to use a three-axis gyro.

The appliance 50 also has means for determining the inclination of the appliance. Specifically, these comprise an inclinometer based on accelerometers for supplying the inclination of the appliance relative to a vertical plane. Once more, this data is given in the form of an angle value.

It should be understood that cell phones are commercially available that have both a compass and an inclinometer.

Finally, the appliance 50 has wireless communications means, e.g. of the WiFi, Wimax, 3G or 4G cellular, or of any other type suitable for connecting with the network 28. In this example, the appliance 50 is connected to a 3G cellular network via a relay antenna A that is connected to the network 28. There follows a description in greater detail of the monitoring method performed by the appliance 50.

Figure 2:
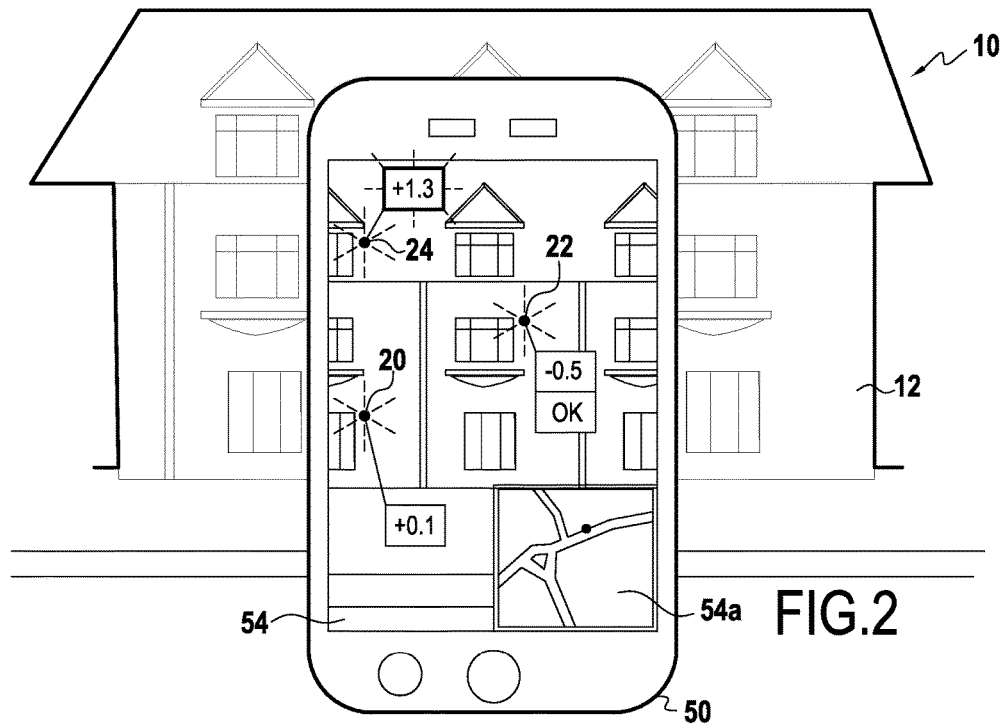
FIG. 2 shows the display device of the appliance when the camera is pointed at the structure to be monitored.

As can be seen in FIG. 2, when the operator positions the appliance 50 so that the camera 52 is filming the building 10, the image of a portion of the building appears on the screen of the appliance 50. The displayed portion of the building 10 is of greater or smaller size as a function of the distance between the operator and the building 10. In this example, the movement measurement devices 20, 22, and 24 are all in the field of view of the camera 52.

In accordance with the invention, the measurement devices 20, 22, and 24, namely the measurement targets 20 and 22, and the extensometer 24 are positioned in the image of the portion of the building 10 in the form of labels inserted in the image.

In other words, labels or dots are superposed on the image of the portion of the building 10 at the locations where the movement measurement devices 20, 22, and 24 are to be found.

In the example of FIG. 2, it can be understood that by means of the invention the operator can discover easily and quickly where the measurement devices 20, 22, and 24 are situated, it being understood that they are usually difficult to distinguish with the naked eye.

Advantageously, for each of the movement measurement devices 20, 22, and 24, the screen 54 also displays the most recently taken measurement. This measurement data is inserted in the image of the portion of the building 10. By clicking on the label symbolizing the measurement device 22, the operating state of the selected measurement device 22 is obtained. In this example, "OK" is displayed under the most recently-taken measurement, which means that the measurement target 22 is operating correctly.

It can also be seen that the measurement data relating to the extensometer 24 is framed and flashing. This means that the local deformation measured by the extensometer exceeds a predetermined value and has caused an alarm to be triggered. Flashing is one example of how alarm data can be inserted in the image of the portion of the building 10.

The operator is thus informed in real time about the values measured by the measurement devices, about their operating states, and whether or not an alarm level has been reached.

In a variant, the screen 54 also displays, in a corner 54a, a 2D (two-dimensional) map of the neighborhood of the operator.

The movement measurement devices 20, 22, and 24 are positioned in the image of the portion of the structure 10 on the basis of their coordinates and of the geographical coordinates of the appliance 50. Use is preferably also made of the orientation and the inclination of the appliance 50. The characteristics of the camera, namely its focal length and its aperture angle may also be used for improving the accuracy with which the measurement devices are positioned in the image.

For example, it is possible to calculate the coordinates of the points of the structure that correspond to the corners of the screen with the help of the coordinates of the appliance, the coordinates of one or more measurement devices, the orientation of the appliance, the inclination of the appliance, and/or the characteristics of the camera. It is thus possible to estimate the positions of the measurement devices within the image displayed on the screen.

Another way of improving the positioning of the measurement devices in the image is described in detail below.

Figure 3:
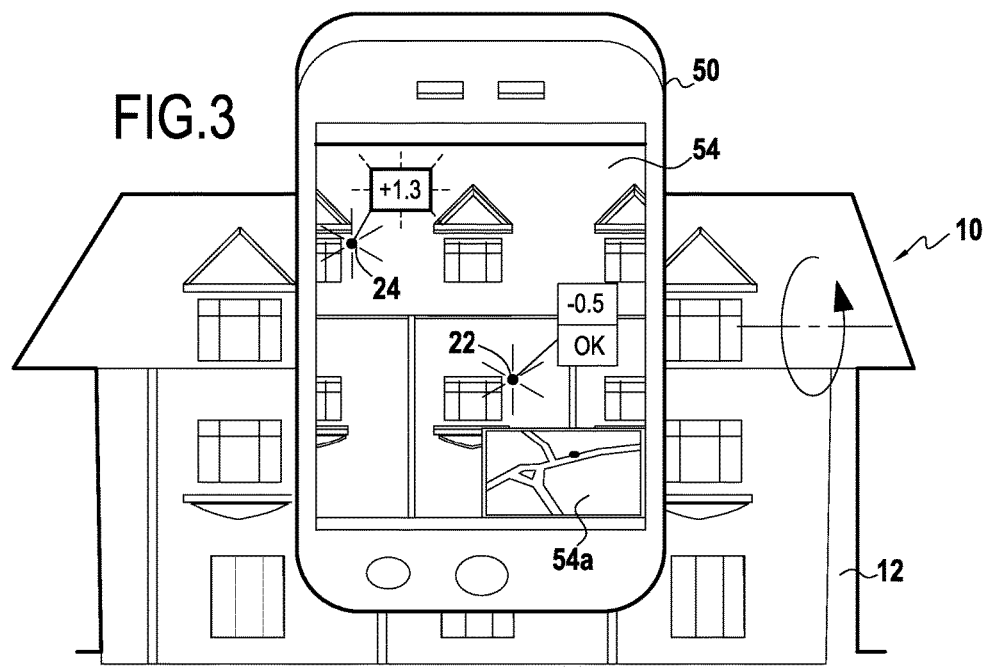
FIG. 3 shows the FIG. 2 appliance when it is inclined relative to a vertical plane.
Figure 4:
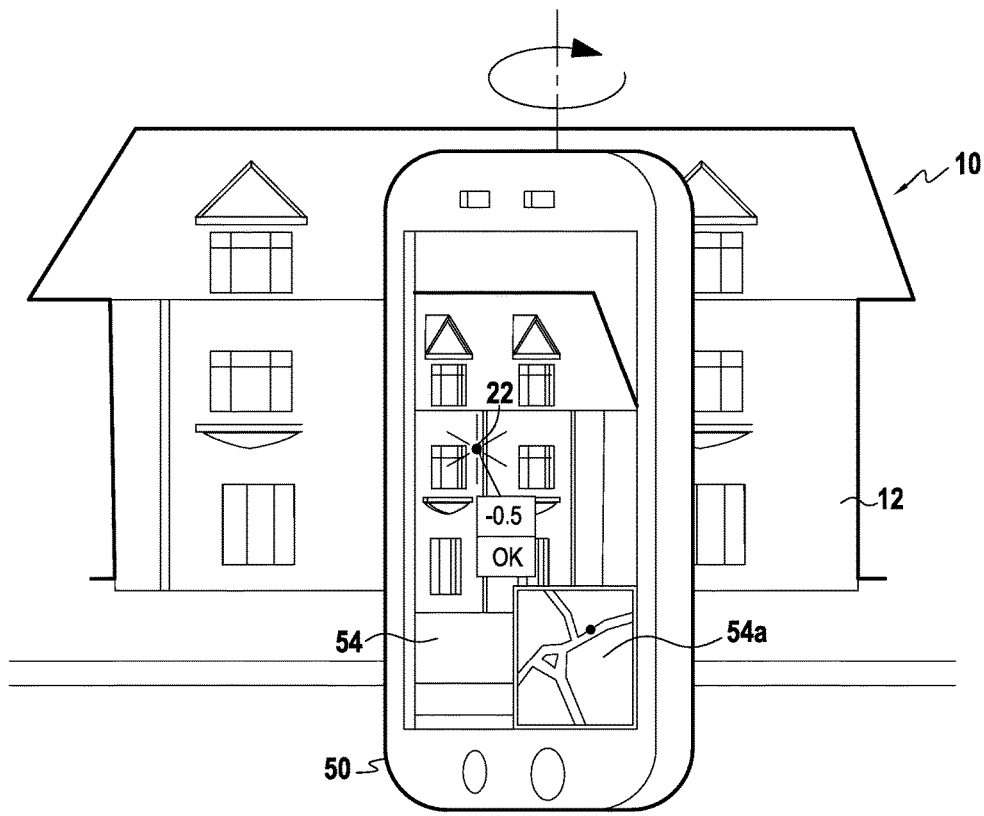
FIG. 4 shows the FIG. 2 appliance when it is pivoted in a horizontal plane.

As can be seen in FIGS. 3 and 4, during movement of the appliance 50, the measurement devices 20, 22, and 24 are repositioned dynamically in the image of the portion of the building 10. To do this, use is made of the orientation and the inclination of the appliance in order to recalculate the positions of the measurement devices. In other words, a filtering step is performed in order to determine from among the measurement devices 20, 22, and 24, a subgroup of measurement devices that are situated in the field of view of the camera. In this example, in FIG. 3 (the appliance 50 is inclined relative to a vertical plane), the subgroup of measurement devices situated in the field of view of the camera 52 is constituted by the measurement target 22 and the extensometer 24, while in FIG. 4 (the appliance 50 pivoted in a horizontal plane), the subgroup is constituted solely by the measurement target 22. Only those measurement devices that belong to the subgroup are positioned in the image of the portion of the building 10.

In another variant, the screen also displays the presence of other movement measurement devices situated close to the appliance but outside the field of view of the camera.

Figure 5:
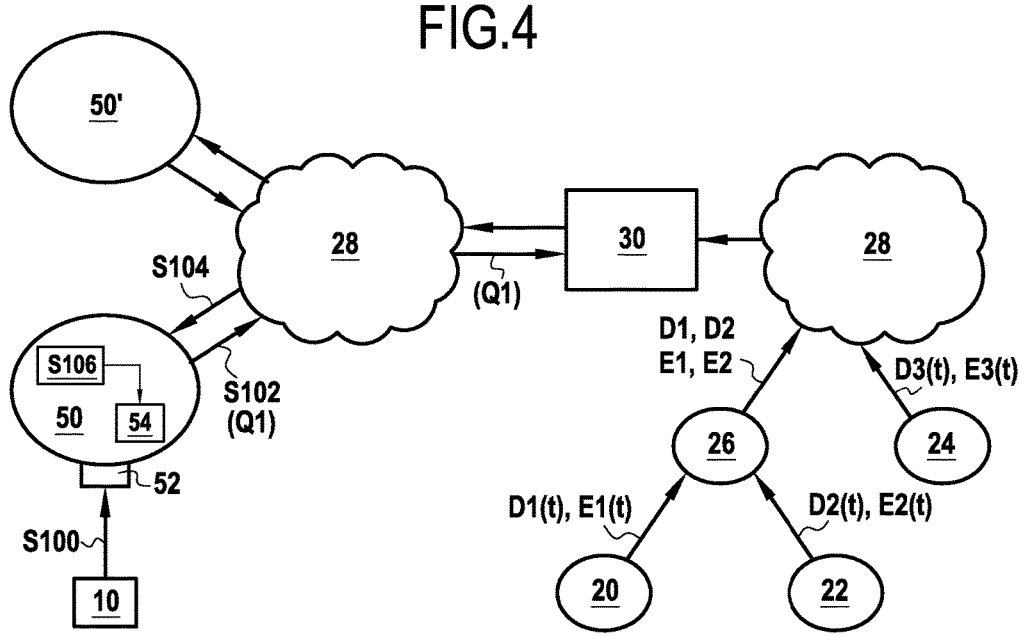
FIG. 5 is a diagram of the data exchanges between the appliance, the remote server, and the movement measurement devices.

With reference to FIG. 5, there follows a more detailed description of a first implementation of the invention, and in particular of the methods of monitoring the deformation of a structure as performed by the appliance 50 and the server 30. It should be understood that the appliance 50 includes a storage unit 53, e.g. a memory, for storing a computer program comprising instructions for executing the above-specified method.

It should also be understood that the appliance 50 is also referred to as a "client" insofar as it is a terminal communicating with the server 30 in a client/server architecture. FIG. 5 shows the exchange of information between the client appliance 50 and the server 30. It can thus be understood that a plurality of appliances 50, 50' can communicate simultaneously with the server 30, thereby enabling a plurality of operators to act simultaneously to monitor a single structure or a plurality of structures being monitored.

In accordance with the invention, the method performed by the appliance 50 includes an acquisition step S100 of acquiring an image of all or part of the building 10 using the camera 52. The method performed by the appliance 50 also includes a sending step S102 of sending a query Q1, e.g. of the SQL (structured query language) type, to the remote server 30. This query seeks to ask the server to send information to the appliance about the movement measurement devices 20, 22, and 24. In this example, the query relates to all of the measurement devices, however it could equally well relate to only those measurement devices that are determined as lying within the field of the view of the camera 52.

In response to the query Q1, the server transmits information to the appliance 50 about the movement measurement devices 20, 22, and 24, namely the measurement data $D1(t)$, $D2(t)$ taken by the theodolite 26 sighting the measurement targets 20, 22, and the measurement data $D3(t)$ taken by the extensometer, together with their respective operating states (operating correctly or failed) $E1(t)$, $E2(t)$, and $E3(t)$. For the measurement targets 20, 22, the operating states $E1(t)$ and $E2(t)$ are provided by the theodolite 26 that indicates in particular any measurement or sighting errors involving the targets. This data may also relate to the operating state of the theodolite itself.

For the extensometer 24, the operating state $E3(t)$ is that of the extensometer 24.

The measurement data $D1(t)$, $D2(t)$, and $D3(t)$, and the operating states $E1(t)$, $E2(t)$, and $E3(t)$ are recovered periodically by the server 30 prior to being stored in the server. This information is transmitted periodically or in real time to the appliance which receives it during a reception step S104.

As can be seen in FIG. 5, the query and the information relating to the movement measurement devices are conveyed by the communications network 28.

This information relating to the movement measurement devices is then inserted into the image, during an insertion step S106, and then displayed on the screen 54, as shown in FIGS. 2 to 4.

Figure 6:
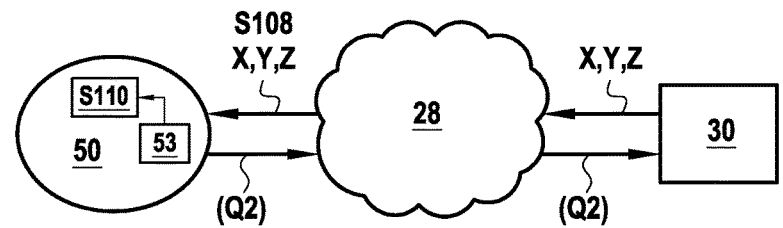
FIG. 6 shows the step of downloading the coordinates of the movement-measurement devices.

In this example, when the user with the appliance 50 first arrives on the site where the structure to be monitored is located, the appliance 50 sends a query Q2 to the server 30 in order to download the X, Y, Z coordinates of the measurement devices 20, 22 and 24. This downloading step S108 is shown diagrammatically in FIG. 6.

The X, Y, Z coordinates are then stored during a storage step S110 in the memory 53 of the appliance 50, which memory may be removable or non-removable.

In an implementation of the invention, the X, Y, Z coordinates are used for positioning the movement measurement devices in the image. More exactly, during the insertion step S106 of inserting information about the movement measurement devices in the image, a positioning step S112 is performed for positioning a graphics representation in the image of one or more of said movement measurement devices, this positioning step being performed with the help of the coordinates of the movement measurement devices, as explained above. In this example, labels symbolizing the movement measurement devices are inserted in the image of the portion of the building.

Figures 7, 8:
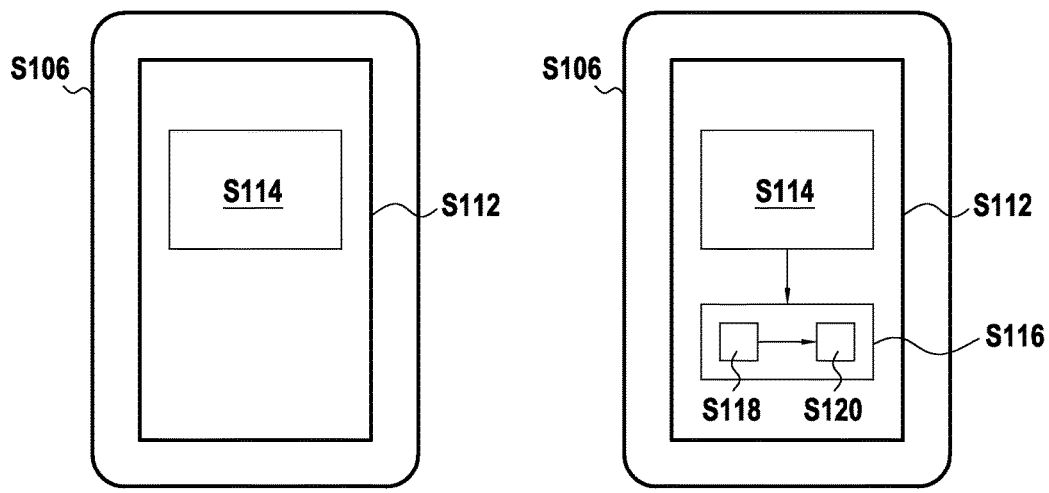
FIG. 7 shows the filtering step and the step of positioning the measurement devices in the image.
FIG. 8 shows the step of recognizing the shape that is characteristic of the monitored structure.
Figure 10:
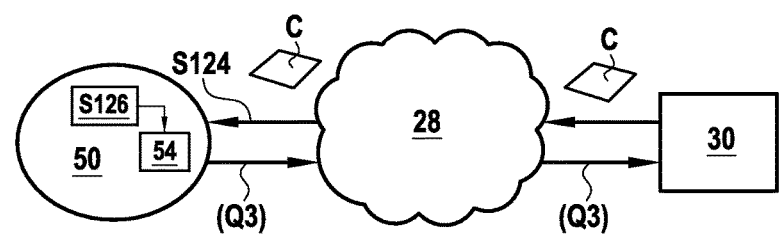
FIG. 10 is a diagram of the step of the appliance receiving a settling curve and inserting it in the image.

As shown diagrammatically in FIG. 7, during the positioning step S112, it is preferable to perform a filtering step S114 in order to determine from among the plurality of measurement devices, a subgroup of measurement devices that are situated in the field of view of the camera 52. In the example of FIG. 2, it should be understood that there are about a dozen measurement targets and that the subgroup is constituted by the measurement targets 20 and 22, and by the extensometer 24. Preferably, but not necessarily, the filtering step also uses the orientation of the appliance 50 in a horizontal plane, together with the geographical position of the appliance and its inclination relative to a vertical plane.

The inclination and the orientation of the appliance 50 are angle data and they serve in particular in dynamic manner to correct the positions of the movement measurement devices in the image.

In a variant shown in FIG. 8, the positioning step S112 also includes a recognition step S116 of recognizing the structure situated in said image. To do this, the recognition step includes an analysis step S118 of analyzing the characteristic shape 100 of the structure situated in the image, and a comparison step S120 of comparing this characteristic shape with characteristic shape models stored in a database.

The characteristic shape 100 of the structure, specifically the portion of the building 10, is constituted by remarkable lines and points of the portion of the building 10 that is visible in the image. Specifically, the characteristic shape 100 comprises certain horizontal lines 102 of the front elevation, the outlines of the windows 104, and the shape of the downpipes 106.

The characteristic shape models are stored in the server 30 or else directly in the appliance 50. Consequently, the recognition step may be performed in the appliance 50 or else in the server 30. Furthermore, and preferably, the recognition step uses the geographical position of the appliance 50, which may optionally be recalibrated. Also preferably, the recognition step uses the orientation of the appliance 50 in a horizontal plane.

For example, the database of characteristic shape models also includes the geographical coordinates of the structures and preferably their orientations, in particular the orientations of the main elevations of the structures.

Figure 9:
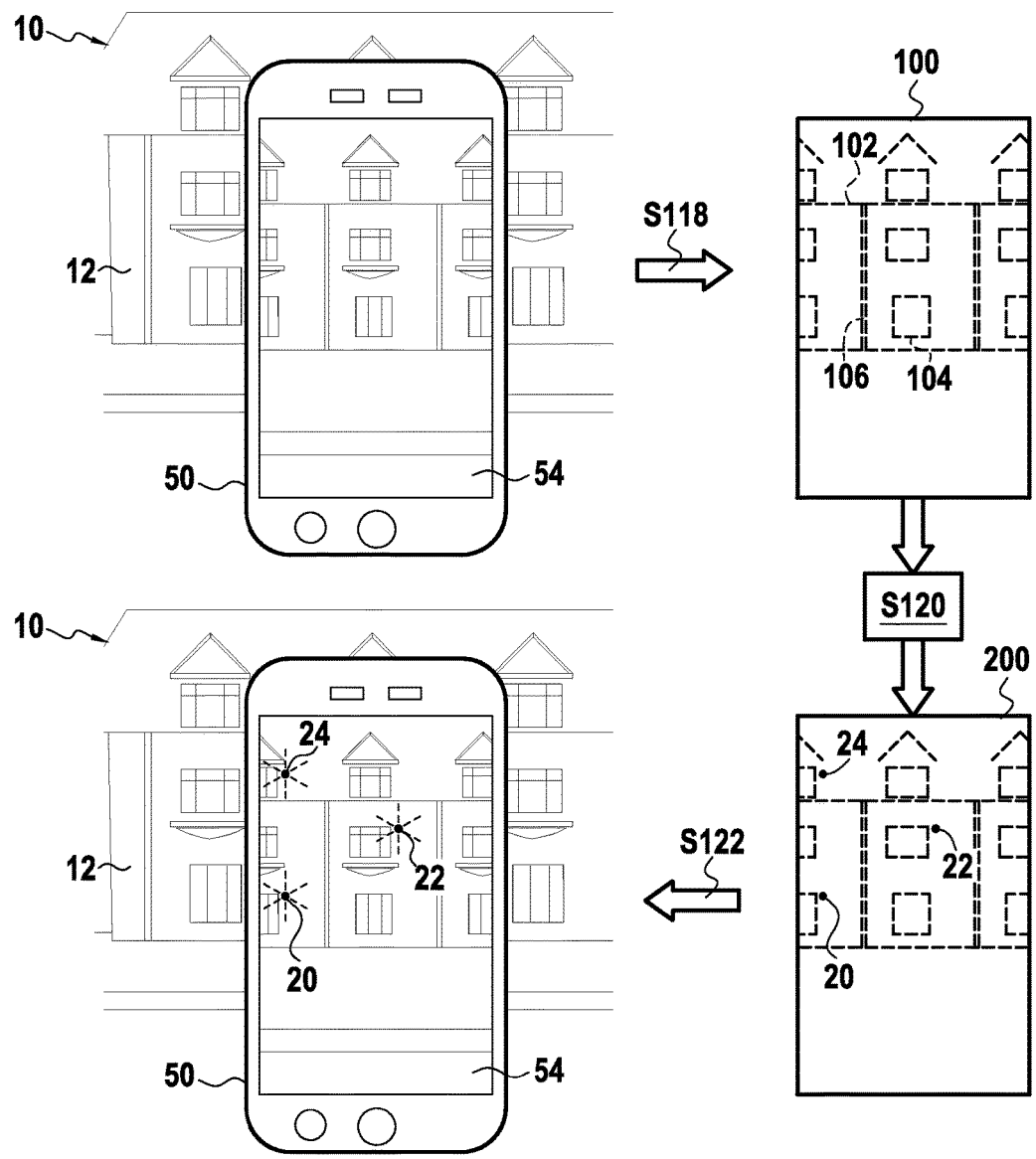
FIG. 9 shows the step of recalibrating the positions of the measurement devices in the image.

At the end of the comparison step, the characteristic shape model 200 of the identified building is used, during a recalibration step S122, for the purpose of recalibrating the positions of the movement measurement devices 20, 22, and 24 in the image of the building 10, it being emphasized that the characteristic shape models preferably include the positions of the various movement measurement devices. This recalculation, shown diagrammatically in FIG. 9, advantageously makes it possible to improve the accuracy with which the measurement devices are positioned in the image.

The method of the invention also includes a step of loading information about the deformation of the building 10. Specifically, this comprises a settling curve C obtained by aggregating a plurality of measurements taken by the movement measurement devices over time. For this purpose, the method includes a sending step S122 of sending a query Q3 to the server 30 and a reception step S124 of receiving as a reply to said query a settling curve C for the building 10, and an insertion step S126 of inserting said information about the movements or the deformation of the structure in the image.

The invention claimed is:

1. A method of representing the movements, if any, of a structure to be monitored, said method being performed in an appliance including a camera, said structure being provided with at least one movement measurement device that is secured to said structure and carries out movement measurements in order to enable deformations of said structure to be measured, said method comprising:
   - acquiring an image of the structure with the help of the camera;
   - sending a query from the appliance to a remote server;
   - receiving, by the appliance, at least some information in response to said query about the movement measurement device, said information including data about at least one movement measurement obtained with the help of the movement measurement device; and
   - inserting data about said at least one movement measurement in said image, including positioning a graphics representation of the movement measurement device in the image, wherein the positioning is performed with the help of coordinates of the movement measurement device or through a recognition step of recognizing the structure situated in said image;
   - wherein the movement measurement device is a measurement target that is sighted by a theodolite connected to the remote server or the movement measurement device is a sensor connected to the remote server.

2. A method according to claim 1, wherein the structure is provided with a plurality of movement measurement devices, and wherein the positioning step includes a filtering step in which movement measurement devices that are situated in the field of view of the camera are selected.

3. A method according to claim 2, wherein the filtering step uses the geographical position of the appliance, the orientation of the appliance, and/or the inclination of the appliance.

4. A method according to claim 1, wherein the recognition step includes an analysis step of analyzing the characteristic shape of the structure situated in the image, and a comparison step of comparing the characteristic shape with characteristic shape models stored in a database.

5. A method according to claim 1, further comprising a sending step of sending a query from the appliance to the remote server and a reception step of the appliance receiving information about the deformation of the structure in response to said query, and an insertion step of inserting said information about the deformation of the structure in the image.

6. A non-transitory computer program product including instructions for executing the steps of the method according to claim 1, when said program is executed by a computer.

7. A method of representing the movements, if any, of a structure, said structure being provided with at least one movement measurement device that is secured to the structure and carries out movement measurements in order to enable movement of the structure to be measured, said method comprising:
   - acquiring an image of the structure with the help of a camera arranged in an appliance;
   - acquiring data about at least one movement measurement obtained with the help of the measurement device;
   - transmitting said movement measurement data to a remote server that is distinct from the appliance;
   - sending a query from the appliance to the remote server;
   - receiving, by the appliance, said movement measurement data in response to the query;
   - inserting said movement measurement data into said image, including positioning a graphics representation of the movement measurement device in the image, wherein the positioning is performed with the help of coordinates of the movement measurement device or through a recognition step of recognizing the structure situated in said image; and
   - displaying, on the appliance, said image having the movement measurement data inserted therein;
   - wherein the movement measurement device is a measurement target that is sighted by a theodolite connected to the remote server or the movement measurement device is a sensor connected to the remote server.

8. An appliance including a camera, a display device, and software means configured to perform the method according to claim 1.

9. An installation comprising a plurality of movement measurement devices secured to a structure to be monitored, a remote server receiving measurement data obtained with the help of the movement measurement devices, and at least one appliance according to claim 8 in communication with said remote server.

10. An installation according to claim 9, wherein the server includes recovery means and storage means for recovering and storing measurement data obtained with the help of the measurement devices.

11. An installation according to claim 9, wherein the plurality of movement measurement devices comprises at least one measurement target sighted by a theodolite that is connected to the remote server, or at least one sensor that is connected to the remote server.

* * * * *